US012530067B2

(12) United States Patent
Kimura

(10) Patent No.: US 12,530,067 B2
(45) Date of Patent: Jan. 20, 2026

(54) VEHICULAR APPARATUS

(71) Applicant: DENSO CORPORATION, Kariya (JP)

(72) Inventor: Takeshi Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 17/552,787

(22) Filed: Dec. 16, 2021

(65) Prior Publication Data

US 2022/0107678 A1    Apr. 7, 2022

Related U.S. Application Data

(63) Continuation of application No. PCT/JP2020/022537, filed on Jun. 8, 2020.

(30) Foreign Application Priority Data

Jun. 21, 2019    (JP) .................................. 2019-115479

(51) Int. Cl.
*G06F 1/3212*    (2019.01)
*B60K 35/215*    (2024.01)
(Continued)

(52) U.S. Cl.
CPC .......... *G06F 1/3212* (2013.01); *B60K 35/215* (2024.01); *B60K 35/28* (2024.01);
(Continued)

(58) Field of Classification Search
CPC ..... G06F 1/3212; G06F 1/3287; B60K 35/00; B60K 2360/195; B60K 2360/197;
(Continued)

(56) References Cited

U.S. PATENT DOCUMENTS

| 6,028,537 | A  | * | 2/2000  | Suman    | B60K 35/265 |
|-----------|----|---|---------|----------|-------------|
|           |    |   |         |          | 340/988     |
| 9,150,110 | B2 | * | 10/2015 | Böld     | B60L 50/15  |
| 10,938,232| B2 | * | 3/2021  | Sarokhan | H02J 7/1492 |
| 2001/0029550| A1| * | 10/2001 | Endo     | G06F 9/544  |
|           |    |   |         |          | 719/319     |

(Continued)

FOREIGN PATENT DOCUMENTS

| EP | 2050610 A1 | * | 4/2009 | ............. G01C 21/36 |
| JP | 2007056728 A | * | 3/2007 | .......... F02N 11/0818 |

(Continued)

*Primary Examiner* — Dale W Hilgendorf
*Assistant Examiner* — Frank T Glenn, III
(74) *Attorney, Agent, or Firm* — Harness, Dickey & Pierce, P.L.C.

(57) ABSTRACT

A vehicular apparatus includes a controller and a voltage detection circuit to detect a voltage of a power supply from a battery mounted on a vehicle. The controller includes a plurality of functional units, which include a first functional unit configured to display information on a state of the vehicle and a second functional unit configured to display multimedia information. The controller is further configured to switch an operation mode to a full operation mode or a restricted operation mode based on the detected voltage of the power supply. The full operation mode enables all the plurality of functional units to be operable. The restricted operation mode enables at least the first functional unit configured to display information on the state of the vehicle to be operable.

10 Claims, 6 Drawing Sheets

(51) Int. Cl.
*B60K 35/28* (2024.01)
*B60K 35/50* (2024.01)
*B60K 35/60* (2024.01)
*B60K 35/81* (2024.01)

(52) U.S. Cl.
CPC .............. *B60K 35/60* (2024.01); *B60K 35/81* (2024.01); *B60K 35/50* (2024.01)

(58) Field of Classification Search
CPC ........ B60K 35/10; B60K 35/22; B60K 35/23; B60K 35/29; B60K 35/60; H02J 2310/48; H02J 7/0048; H02J 7/0049; Y02D 10/00; B60R 16/02
See application file for complete search history.

(56) References Cited

U.S. PATENT DOCUMENTS

| | | | |
|---|---|---|---|
| 2004/0189098 A1* | 9/2004 | Algrain | F01M 5/02 307/80 |
| 2011/0145762 A1* | 6/2011 | Chun | G06F 1/3246 715/810 |
| 2018/0196500 A1* | 7/2018 | Tokioka | H03L 5/00 |
| 2020/0148144 A1 | 5/2020 | Shiomi | |

FOREIGN PATENT DOCUMENTS

| | | | | |
|---|---|---|---|---|
| JP | 2012206543 A | * | 10/2012 | |
| JP | 2015094262 A | | 5/2015 | |
| JP | 2016112953 A | * | 6/2016 | |
| JP | 2019018844 A | | 2/2019 | |
| WO | WO-2013183085 A1 | * | 12/2013 | ............. B60R 16/02 |

\* cited by examiner

VEHICULAR APPARATUS

CROSS REFERENCE TO RELATED APPLICATIONS

The present application is a continuation application of International Patent Application No. PCT/JP2020/022537 filed on Jun. 8, 2020, which designated the U.S. and claims the benefit of priority from Japanese Patent Application No. 2019-115479 filed on Jun. 21, 2019. The entire disclosures of all of the above applications are incorporated herein by reference.

TECHNICAL FIELD

The present disclosure relates to a vehicular apparatus.

BACKGROUND

There is known a vehicular apparatus that displays information in a display in a vehicle. The displayed information is related to the state of the vehicle such as speed, warnings, or regulations, or related to so-called multimedia display such as a navigation screen image and a menu screen image. There is also known a vehicular apparatus integrating a functional unit for displaying information on the state of a vehicle and a functional unit for displaying multimedia information. Hereinafter, a vehicular apparatus integrating a plurality of functional units will be referred to as an integrated vehicular apparatus for convenience.

SUMMARY

According to an example of the present disclosure, a vehicular apparatus is provided to include a controller and a voltage detection circuit to detect a voltage of a power supply from a battery mounted on a vehicle. The controller includes a plurality of functional units, which include a first functional unit configured to display information on a state of the vehicle and a second functional unit configured to display multimedia information. The controller is further configured to switch an operation mode to a full operation mode or a restricted operation mode based on the detected voltage of the power supply. The full operation mode enables all the plurality of functional units to be operable. The restricted operation mode enables at least the first functional unit configured to display information on the state of the vehicle to be operable.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
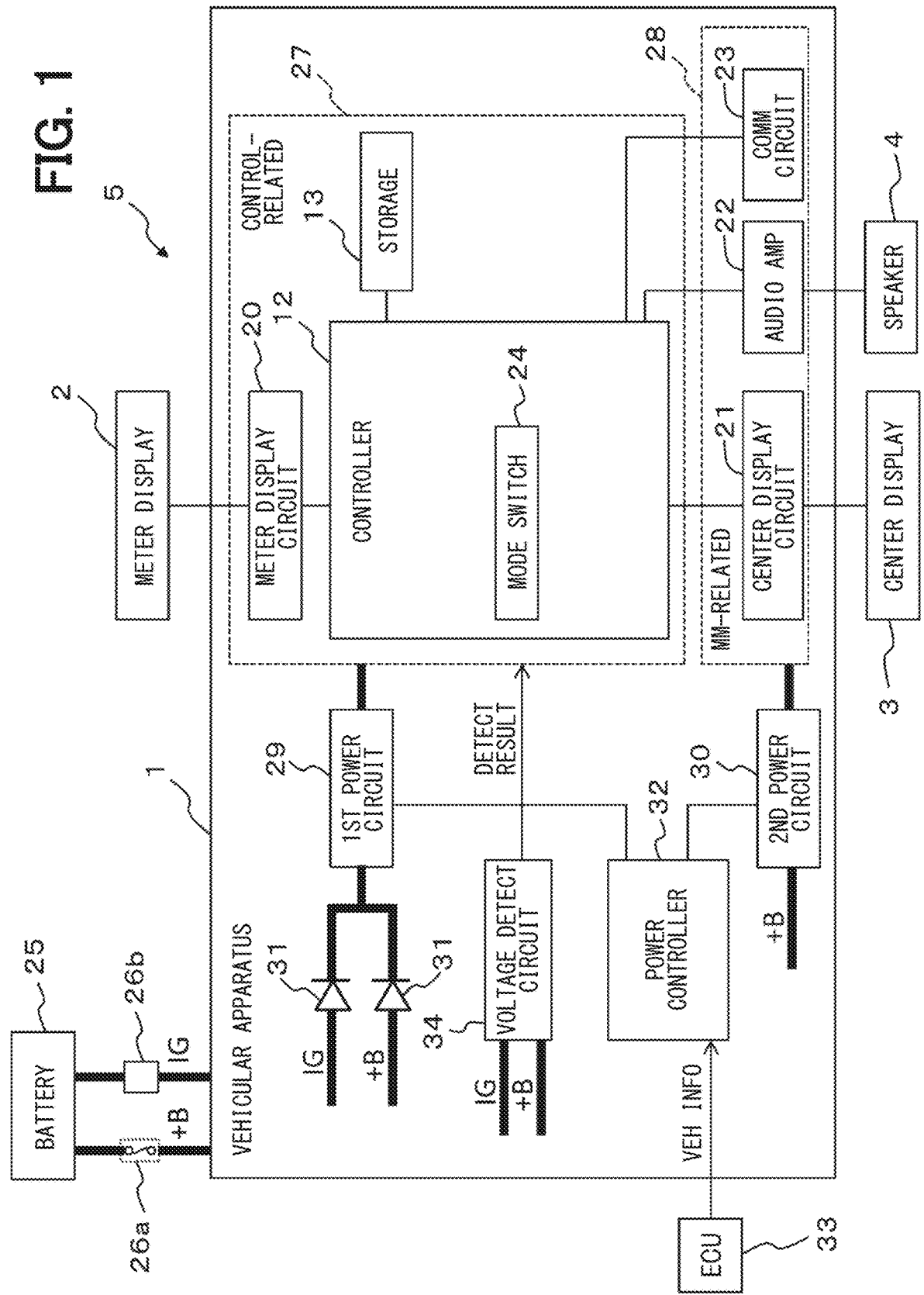
FIG. 1 is a diagram schematically showing a configuration of a vehicular apparatus according to an embodiment.

Hereinafter, an embodiment will be described. As shown in FIG. 1, a vehicular apparatus 1 is connected to a display such as a meter display 2 and a center display 3. As will be described later, these displays are provided to display information on the state of the vehicle, information necessary for traveling, or information such as a navigation screen image or a menu screen image. Further, the vehicular apparatus 1 is connected to a speaker 4 that outputs guidance sounds during navigation or reproduces a music. The vehicular apparatus 1 is included in a cockpit system 5 that realizes so-called vehicle infotainment that presents various types of information to the user.

Figure 2:
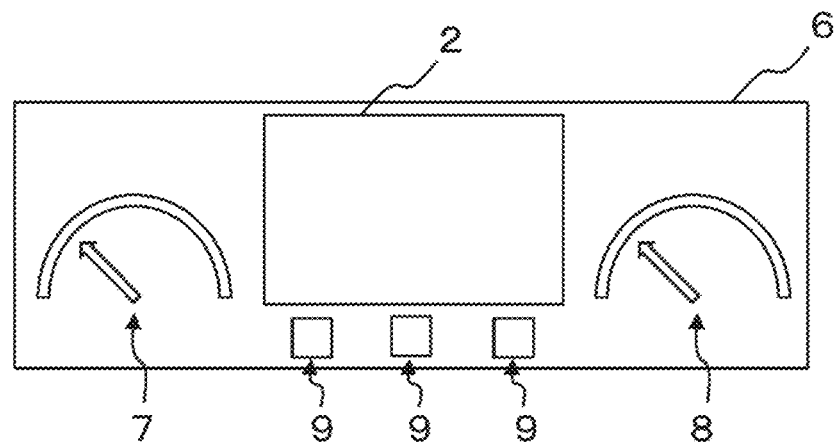
FIG. 2 is a diagram schematically showing a configuration of a meter display.

The meter display 2 is composed of, for example, a liquid crystal display or an organic EL display, and is provided on a meter panel 6 located adjacent to the front of the driver. As shown in FIG. 2, the meter panel 6 is provided with a speedometer 7, a rotation speed meter 8, various warning lights 9, and the like; a meter display 2 is provided at the center thereof. The entire meter panel 6 may be composed of a display to form the meter display 2, and the speedometer 7, the rotation speed meter 8, the warning lights 9, etc. may be displayed in full graphic.

The meter display 2 mainly displays information on the state of the vehicle and information on the running and/or safety of the vehicle, such as speed, warnings, or information stipulated by law. Hereinafter, they will be referred to as vehicle information for convenience. Further, the meter display 2 also displays (i) an activation message when the vehicular apparatus 1 is activated, (ii) a stop message when the vehicular apparatus 1 is stopped, and the like.

Figure 3:
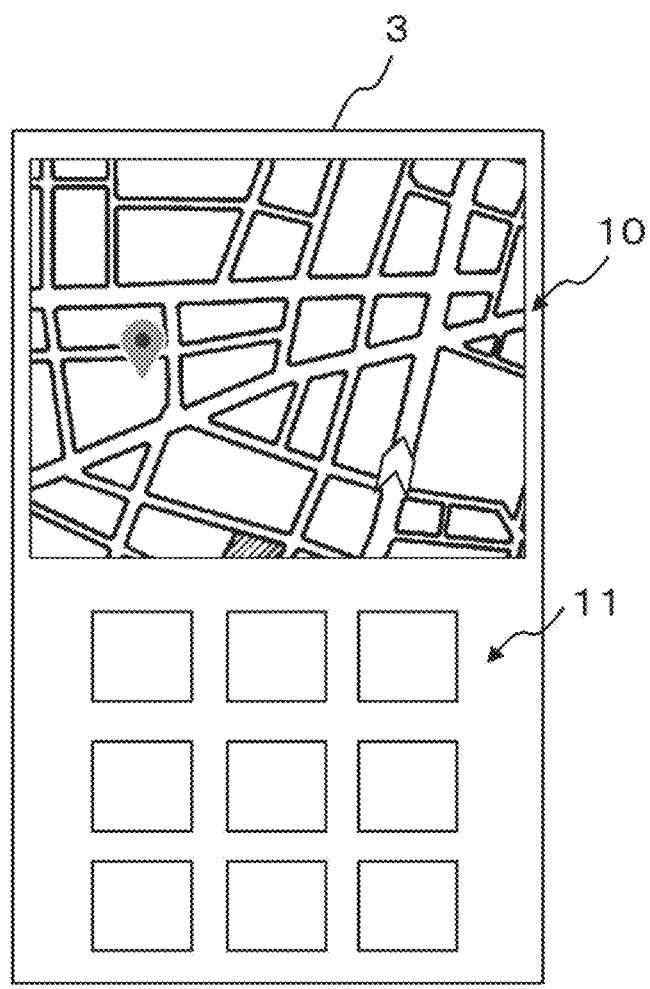
FIG. 3 is a diagram schematically showing a configuration of a center display.

The center display 3 is composed of, for example, a liquid crystal display or an organic EL display, and is arranged to be adjacent to a so-called center console. As shown in FIG. 3, the center display 3 displays, for example, a navigation screen image 10 and/or a menu screen image 11. In addition, the center display 3 can also display information such as TV broadcasting and music being played. That is, the center display 3 mainly displays so-called multimedia information such as the navigation screen image 10 and the menu screen image 11.

Thus, the vehicular apparatus 1 is provided as an integrated type in which a plurality of functional units including (i) a functional unit for displaying information on the state of the vehicle and (ii) a functional unit for displaying multimedia information are integrated. In addition, the vehicular apparatus 1 can visually present various types of information to the user. The display control of both the meter display 2 and the center display 3 is performed by the vehicular apparatus 1. Therefore, the displays (i.e., indicators) can be seamlessly linked to each other; for example, the navigation screen image 10 can be displayed on the meter display 2 and the speed can be displayed on the center display 3. Note that in the present embodiment, the number, arrangement, or type of displays connected to the vehicular apparatus 1 is just an example, and is not restricted thereto.

Figure 4:
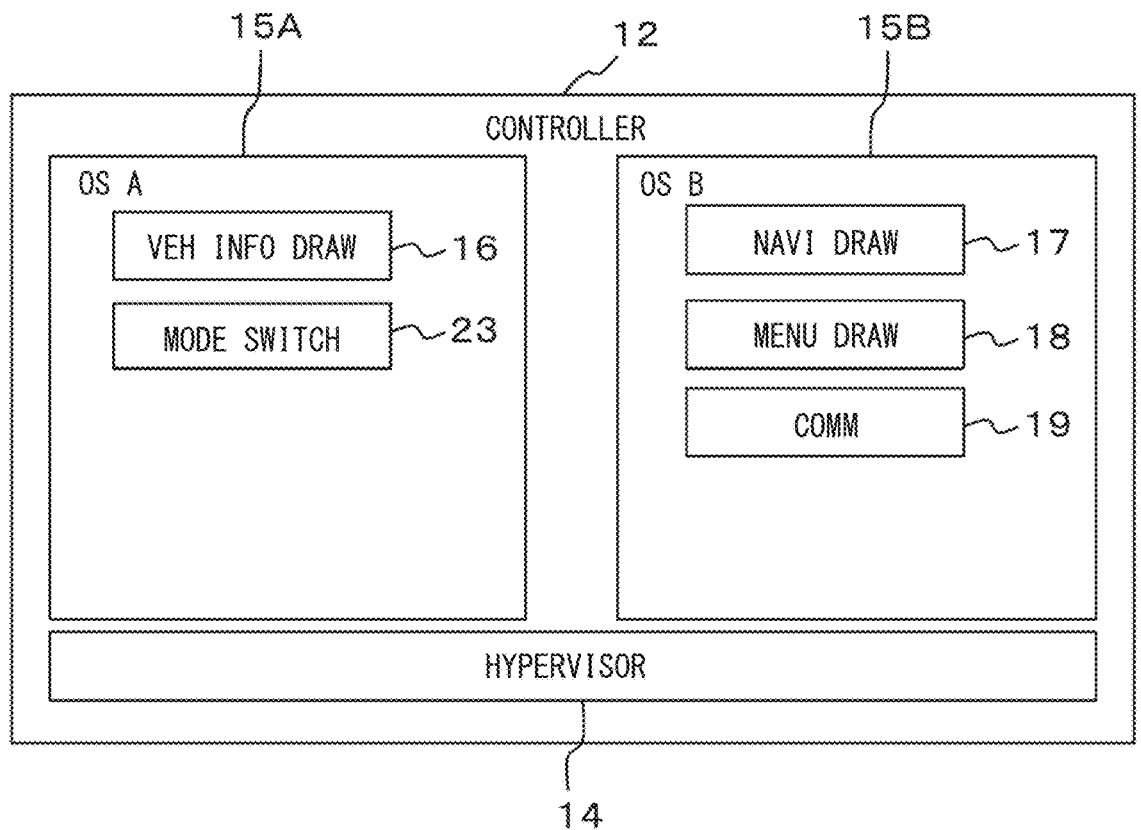
FIG. 4 is a diagram schematically showing a software configuration of a controller unit.

The controller unit 12, which may also be referred to as a controller or a display controller, is composed of a so-called microprocessor having a CPU or the like (not shown), for instance. The controller unit 12 controls the vehicular apparatus 1 by executing a program stored in a storage unit 13 composed of a non-volatile memory such as an eMMC (i.e., embedded MultiMediaCard). In the present disclosure, as shown in FIG. 4, the controller unit 12 is configured to provide a virtual environment in which a hypervisor 14 and two operating systems 15 operating on the hypervisor 14 operate.

That is, in the vehicular apparatus 1, a plurality of systems are operating on one hardware. Hereinafter, the operating system 15 will be referred to as an OS 15. For example, when the OS 15A has a hypervisor function, the OS 15B may be operated on the hypervisor function of the OS 15A.

The OS 15A is a so-called real-time OS, and mainly executes a process that requires real-time performance such as a process related to vehicle running or safety, as compared with the OS 15B, for example. In general, such a real-time OS is less likely to cause a problem in the OS 15A itself, and can be considered to have relatively higher stability than a general-purpose OS because it can predict or restrict the execution time of an application.

In contrast, the OS 15B is a so-called general-purpose OS. Although its real-time performance is relatively low as compared with the OS 15A, it has an advantage that general-purpose processing such as a multimedia function can be easily executed. Then, the controller unit 12 controls the functional units in the vehicular apparatus 1 by appropriately executing a program on each OS 15.

The functional units included in the controller unit 12 include, for example, a vehicle information drawing unit 16 that displays vehicle information on the meter display 2, a navigation drawing unit 17 that displays the navigation screen image 10 on the center display 3, a menu drawing unit 18 that displays the menu screen image 11, and a communication unit 19 that communicates with an external device. These functional units are implemented by software by a program executed on the controller unit 12. The functional unit shown in FIG. 4 is an example, and is not limited thereto.

Note that vehicle information is related to the running and safety of the vehicle, so prompt display and appropriate update are required. Therefore, the vehicle information drawing unit 16 is provided on the more stable OS 15A. Further, it can be said that the vehicle information drawing unit 16 is a functional unit that should maintain its operation even when the voltage of the power supply from the battery 25 drops. As shown in FIG. 1, the information displayed by the vehicle information drawing unit 16 is transmitted to the meter display 2 as drawing data in, for example, LVDS format via the meter display circuit 20.

On the other hand, for example, the navigation screen image 10 and the menu screen image 11 do not require much real-time performance as compared with vehicle information, and are multimedia information such as images, videos, music, and guidance sounds. Therefore, the navigation drawing unit 17 and the menu drawing unit 18 are mounted on the OS 15B.

The information displayed by the navigation drawing unit 17 and the menu drawing unit 18 is transmitted to the center display 3 as drawing data in, for example, LVDS format via the center display circuit 21. Further, the music and the guidance sounds are output to the speaker 4 as an audio signal via the audio amplifier 22 and reproduced. Further, the navigation drawing unit 17 and the menu drawing unit 18 may be a functional unit of which the necessity of maintaining the operation is relatively low as compared with the vehicle information drawing unit 16 described above when the voltage of the power supply from the battery 25 drops.

Since the communication unit 19 that communicates with an external device is expected to be connected to various devices, it is mounted on the OS 15B in order to perform general-purpose processing. The communication circuit 23 communicates with an external device by, for example, a communication method such as USB, Wi-Fi, or Bluetooth (registered trademark). It should be noted that other communication methods may be adopted, or a plurality of communication methods may be adopted. The communication unit 19 may be a functional unit of which the necessity of maintaining the operation is relatively low as compared with the vehicle information drawing unit 16 described above when the voltage of the power supply from the battery 25 drops.

Further, the controller unit 12 includes a mode switching unit 24 as shown in FIGS. 1 and 4. The mode switching unit 24 is configured to switch an operation mode to a full operation mode or a restricted operation mode. In the full operation mode, all the functional units included in the controller unit 12 are in an operable state. In the restricted operation mode, some functional units of all the functional units are in an operable state. In the present embodiment, the mode switching unit 24 maintains at least the operation of the vehicle information drawing unit 16 which is a functional unit for displaying information on the state of the vehicle and which is a functional unit for displaying information on the meter display 2. The mode switching unit 24 will be described in detail later.

As shown in FIG. 1, the vehicular apparatus 1 is supplied with power from the battery 25 mounted on the vehicle. In this case, the vehicular apparatus 1 is supplied with power from a path connected to the battery 25 via the fuse 26a and a path connected to the battery 25 via the switch 26b linked to the ignition. Hereinafter, the power supplied from the battery 25 via the fuse 26a is referred to as +B, and the power supplied via the switch 26b is referred to as IG. IG is an abbreviation for IGnition. Further, in FIG. 1, +B and IG are shown by relatively thick solid lines for the sake of explanation.

As described above, the integrated vehicular apparatus 1 includes both (i) a functional unit that should maintain operation in a battery drop that the voltage of the power supply from the battery 25 drops and (ii) a functional unit that has a relatively low need to maintain operation in the battery drop. Hereinafter, the functional unit whose operation should be maintained when a voltage drop occurs is referred to as a control-related functional unit or as a first functional unit for convenience, and the functional unit whose operation is relatively less necessary is referred to as an MM-related functional unit or a second functional unit for convenience. Note that MM is an abbreviation for Multimedia.

The control-related functional unit uses a device (i.e., in-vehicle device) such as the controller unit 12, the storage unit 13, and/or the meter display circuit 20. Hereinafter, the device used by the control-related functional unit will be referred to as a control-related device(s) 27 for convenience. The control-related functional unit corresponds to the functional unit that maintains the operation in the restricted operation mode described later. The control-related device 27 corresponds to a restricted device used by a functional unit that is in an operable state in the restricted operation mode described later.

On the other hand, the MM-related functional unit uses a device (i.e., in-vehicle device) such as the center display circuit 21, the audio amplifier 22, and/or the communication circuit 23. Hereinafter, the device used by the MM-related functional unit will be referred to as an MM-related device 28 for convenience. The MM-related functional unit corresponds to a functional unit whose operation is restricted in the restricted operation mode. The MM-related device 28 corresponds to a restricted device used by the functional unit whose operation is restricted in the restricted operation mode.

Power is supplied to the control-related device 27 from a first power supply circuit 29. The first power supply circuit 29 is provided to be low voltage compatible (i.e., to support the low voltage). Therefore, the power can be supplied to the control-related device 27 even when the voltage of the power supply from the battery 25 drops. More specifically, in the first power supply circuit 29, the minimum operating voltage at which power can be supplied is set lower than each of the falling threshold value and rising threshold value described later.

IG and +B are each input to the first power supply circuit 29 by the wired OR via diodes 31. Therefore, for example, even when the fuse 26a is removed in order to reduce the dark current during transportation of the vehicle, the switch 26b is turned on. As a result, power can be supplied from the first power supply circuit 29 to the control-related device 27. Therefore, it is possible to display on the meter display 2. Further, since the first power supply circuit 29 is compatible with a low voltage, it is possible to supply enough power for the control-related device 27 to operate normally even when a voltage drop occurs during cranking.

On the other hand, the MM-related device 28 is supplied with power from the second power supply circuit 30. Although the minimum operating voltage of the second power supply circuit 30 is lower than the rated voltage of the battery 25, the second power supply circuit 30 does not have a circuit configuration compatible with a low voltage like the first power supply circuit 29. Therefore, when the voltage of the power supply from the battery 25 drops significantly, the power supply to the MM-related device 28 may become unstable. +B is input to the second power supply circuit 30.

The first power supply circuit 29 and the second power supply circuit 30 are controlled by the power supply controller unit 32. The power supply controller unit 32, which may also be referred to as a power supply controller, is always energized and is normally in a sleep state. Then, the power supply controller unit 32 is activated when a predetermined signal for activating the vehicular apparatus 1 is input from the external ECU 33 connected via the CAN line, and starts controlling each power supply circuit 29, 30. Such a predetermined signal for activating the vehicular apparatus 1 includes a signal indicating that the door of the vehicle has been opened, for instance.

Further, the vehicular apparatus 1 is provided with a voltage detection circuit 34. The voltage detection circuit 34 is composed of, for example, a comparator with hysteresis, and compares the voltage of the power supply with a predetermined reference voltage. In this case, the reference voltages are set for IG and +B, respectively. The voltage detection circuit 34 outputs an L level signal when the voltage of the power supply is lower than the reference voltage, and outputs an H level signal when the voltage of the power supply is equal to or higher than the reference voltage.

More specifically, the reference voltage with respect to IG is set as a predetermined lower limit threshold value (IGL) and a predetermined upper limit threshold value (IGH), which will be described later. Further, the reference voltage with respect to +B is set as a predetermined falling threshold value (+BL) and a predetermined rising threshold value (+BH), which will be described later.

Then, the voltage detection circuit 34 outputs the result of comparing IG and +B with each threshold value to the controller unit 12 as the detection result. The voltage detection circuit 34 is composed of a step-down circuit or an AD converter. The voltage value can be input to the controller unit 12; the comparison with the threshold value can be performed in the controller unit 12.

Next, the operation of the vehicular apparatus 1 having the above configuration will be described. As described above, in the integrated vehicular apparatus 1, the first power supply circuit 29 that supplies power to the control-related devices 27 is configured to support low voltage (i.e., to be low voltage compatible) so that the control-related functional units operate correctly even if a voltage drop occurs.

On the other hand, the second power supply circuit 30 that supplies power to the MM-related device 28 is not configured to support low voltage (i.e., to be low voltage compatible). Therefore, when a large voltage drop occurs, the power supply to the MM-related devices 28 becomes unstable, and the MM-related devices 28 may stop. As a result, there may be risks of malfunctions such as a malfunction that the MM-related functional units may not function properly, or a malfunction that may operate the MM-related functional unit to input a signal higher than the lowered voltage of the power supply to the MM-related devices 28 to damage.

Figure 5:
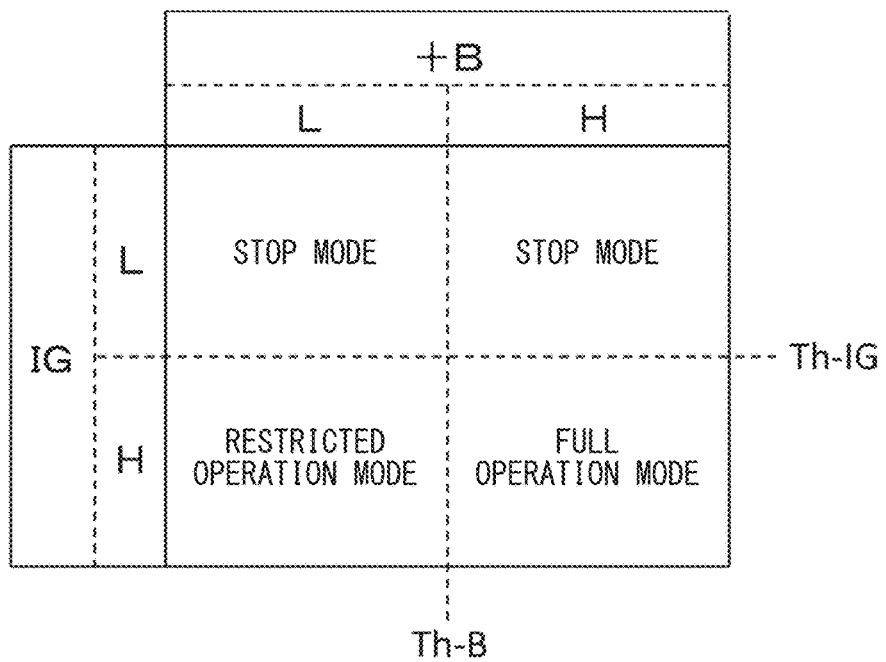
FIG. 5 is a diagram schematically showing a plurality of operation modes set in the vehicular apparatus.

Therefore, the vehicular apparatus 1 is configured to reduce the possibility that a malfunction occurs due to an occurrence of a voltage drop. Specifically, as shown in FIG. 5, the vehicular apparatus 1 assigns each of the IG voltage and the +B voltage detected by the voltage detection circuit 34 with two different operation modes. That is, the two different operation modes are set separately for the case where the higher voltage H is higher than the predetermined reference value and the case where the lower voltage L is lower than the reference value. This reference value is set to a value at which the power supply may become unstable when the voltage drops below the reference voltage. More specifically, the reference value (Th-IG) with respect to IG is set to a value higher than the minimum operating voltage of the first power supply circuit 29. Further, the reference value (Th-B) with respect to +B is set to be higher than the minimum operating voltage of the second power supply circuit 30.

In other words, the range in which the IG is H is a range in which the power supply to the control-related devices 27 is stable. The range in which the IG is L is a range in which the power supply to the control-related devices 27 may become unstable. Similarly, the range in which +B becomes H is a range in which the power supply to the MM-related devices 28 is stable. The range in which +B is L is a range in which the power supply to the MM-related devices 28 may become unstable.

When both IG and +B are H, it is considered that the power supply to the control-related devices 27 and the MM-related devices 28 is stable. Therefore, when both IG and +B are H, a full operation mode is set in which all the functional units included in the controller unit 12 are in an operable state.

On the other hand, when IG is H and +B is L, the power supply to the control-related devices 27 is stable. On the other hand, it is considered that the power supply to the MM-related devices 28 may become unstable. Therefore, when IG is H and +B is L, a restricted operation mode is set in which some of the functional units included in the controller unit 12 can be operated.

In the present embodiment, in the restricted operation mode, the operation of the control-related functional unit is made operable, while the operation of the MM-related functional unit is restricted. In this restricted operation mode, the operation of the device used by the functional unit whose operation is restricted is also restricted. For example, when the operation of the navigation drawing unit 17 among the MM-related functional units is restricted, the operation of the center display circuit 21 is also restricted. Note that the operation of the device can be restricted by performing processing according to the target device, such as disabling the output of the signal or setting the input side to high impedance.

Further, when IG is L, it is considered that the power supply to the control-related devices 27 may become unstable regardless of whether +B is H or L. Therefore, when the IG is L, the stop mode is set. In this embodiment, this stop mode is an operation mode assuming that a voltage drop occurs during normal operation. That is, since the controller unit 12 is operating even when the IG changes from H to L, the operation mode can be switched.

In this stop mode, most of the functional units included in the controller unit 12 are in a state of restricted operation. It is noted that the IG is L at the so-called cold start. Thus, in this case, since the power is not supplied in the first place, the controller unit 12 is in a stopped state.

In this way, the operation mode is switched based on the voltage of IG and +B. As a result, for example, when the power supply to the MM-related devices 28 may become unstable, the operations of the MM-related functional units and the operations of the MM-related devices 28 are restricted. Alternatively, when the power supply to the control-related devices 27 may become unstable, the operations of the control-related functional units and the operations of the control-related device 27 are restricted. As a result, it is possible to reduce the possibility that a malfunction will occur when a voltage drop occurs.

Further, when IG and +B are compared with a single reference value, the following cases are concerned. That is, when a temporary voltage drop occurs, it is considered that the voltage fluctuates in a short period of time. Then, if the fluctuation of the voltage occurs in a state of straddling the reference value for switching the operation mode, the switching of the operation mode may be repeated in a short period of time. As a result, from the user's point of view, the operation of the vehicular apparatus 1 seems to be very unstable.

Then, in the integrated vehicular apparatus 1, a functional unit that operates correctly even when a voltage drop occurs as described above and a functional unit that may not maintain the operation when the voltage drop occurs are mixed. Therefore, if a part of the functional units operate correctly but the remaining part of the functional units do not operate correctly, it is considered that it is easy to feel that a problem has occurred in the vehicular apparatus 1.

Therefore, the vehicular apparatus 1 sets the threshold value for switching the operation mode to mutually different values respectively for the IG and +B depending on whether the voltage rises or falls. That is, the vehicular apparatus 1 has a hysteresis for switching the operation mode.

Specifically, for IG, a lower limit threshold value (IGL) and an upper limit threshold value (IGH) set higher than the lower limit threshold value (IGL) are set. This lower limit threshold value (IGL) is set higher than the minimum operating voltage of the first power supply circuit 29. Therefore, the upper limit threshold value (IGH) is also set higher than the minimum operating voltage of the first power supply circuit 29.

Further, for +B, a falling threshold value (+BL) and a rising threshold value (+BH) set higher than the falling threshold value (+BL) are set. This falling threshold value (+BL) is set higher than the minimum operating voltage of the second power supply circuit 30. Therefore, the rising threshold value (+BH) is also set higher than the minimum operating voltage of the second power supply circuit 30. As described above, the minimum operating voltage of the second power supply circuit 30 is higher than the minimum operating voltage of the first power supply circuit 29.

Figure 6:
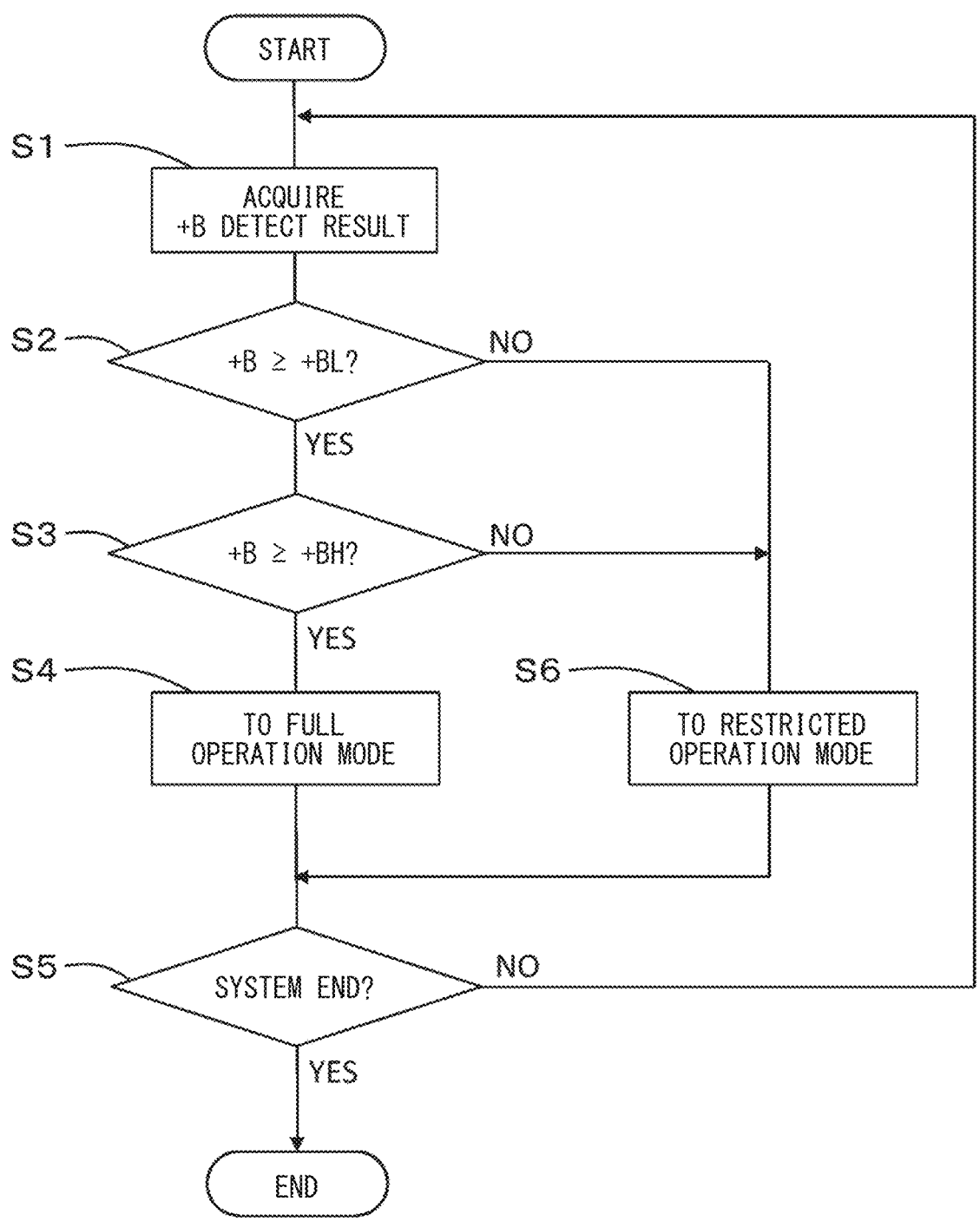
FIG. 6 is a diagram showing a flowchart (part 1) of processing by a mode switching unit.
Figure 7:
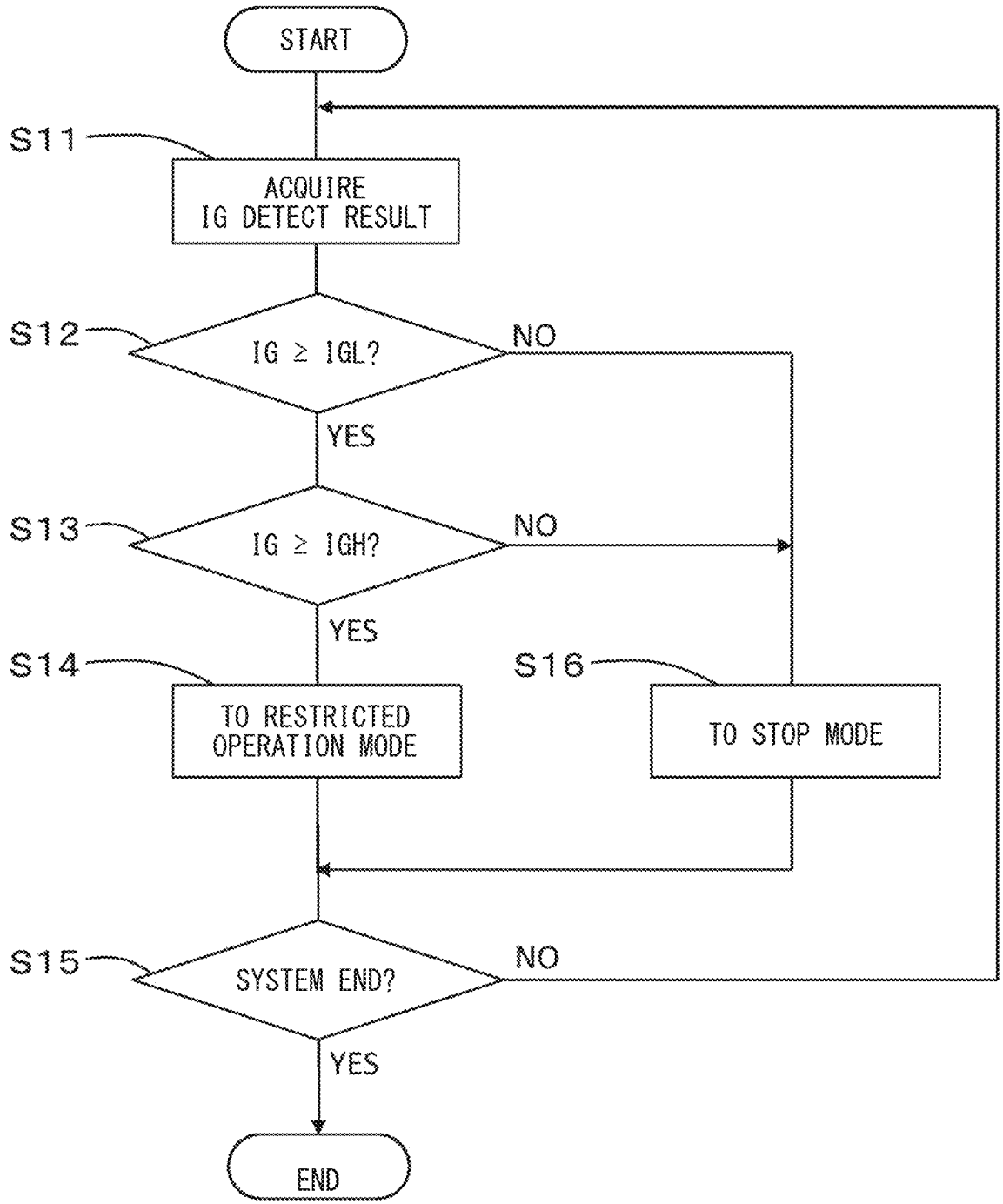
FIG. 7 is a diagram showing a flowchart (part 2) of processing by the mode switching unit.

Then, the mode switching unit 24 switches the operation mode by executing the processes shown in FIGS. 6 and 7. Although the processes shown in FIGS. 6 and 7 can be executed in parallel, they will be described individually for the sake of simplification of the description.

First, the process shown in FIG. 6 for switching the operation mode based on +B will be described. For the sake of simplification of the explanation, the following will describe two cases. A first case is a case where the voltage drop occurs in the state of the full operation mode. A second case is a case where the voltage rises after the voltage drop is resolved.

First, the first case where the voltage drops will be described. In step S1, the mode switching unit 24 acquires the detection result from the voltage detection circuit 34. In this step S1, as the detection result, the result of comparing +B with the falling threshold value (+BL) and the result of comparing +B with the rising threshold value (+BH) are acquired. When the detection result is acquired, the mode switching unit 24 determines in step S2 whether +B is equal to or higher than +BL.

When the mode switching unit 24 determines that +B is not equal to or higher than +BL, the result becomes NO in step S2, so that the mode switching unit 24 shifts to step S6 and switches the operation mode to the restricted operation mode. As a result, when a voltage drop occurs and +B becomes lower than +BL, at least a part of the operation of the MM-related functional units and the MM-related devices 28 is restricted. In other words, the mode switching unit 24 restricts the functional units and devices that can operate in the restricted operation mode to the control-related functional units and the control-related devices 27. In other words, the mode switching unit 24 causes only the control-related functional units and the control-related devices 27 to be operable in the restricted operation mode.

Subsequently, the mode switching unit 24 shifts to step S5 and determines whether or not the system is ended to stop the operation of the vehicular apparatus 1. When the mode switching unit 24 determines that the system is ended, the result becomes YES in step S5. Thus the process is ended. On the other hand, when the mode switching unit 24 determines that the system is not ended, the result becomes NO in step S5. Thus the process proceeds to step S1 and the acquisition and determination of the detection result are repeated.

When it is determined that +B is not equal to or higher than +BL again after switching to the restricted operation mode, the operation mode is not switched in step S6, and the current restricted operation mode is maintained.

Now, suppose that after switching to the restricted operation mode, the voltage drop is resolved and the voltage rises. In this case, the mode switching unit 24 compares, in step S2, the detection result acquired in step S1, and determines that +B is equal to or higher than +BL.

Therefore, the result becomes YES in step S2; thus, the mode switching unit 24 determines whether +B is equal to or higher than +BH in step S3. At this time, when the mode switching unit 24 determines that +B is not equal to or higher than +BH, the result becomes NO in step S3. Thus, the mode switching unit 24 shifts to step S6 and maintains the restricted operation mode.

On the other hand, when the mode switching unit 24 determines that +B is equal to or higher than +BH, the result becomes YES in step S3. Thus, the mode switching unit 24 switches the operation mode from the restricted operation mode to the full operation mode in step S4. As a result, in the present embodiment, the restriction on the operation of the MM-related functional units and the MM-related devices 28 are released, and all the functional units included in the controller unit 12 can be operable. In this way, the mode switching unit 24 switches between the full operation mode and the restricted operation mode based on +B.

Next, the process shown in FIG. 7 for switching the operation mode based on IG will be described. For the sake of simplification of the explanation, the following will describe two cases as examples. A first case is a case where in the restricted operation mode after the voltage drops from the rated voltage, the voltage further drops. A second case is a case where thereafter the voltage rises.

First, a first case where the voltage drops will be described. In step S11, the mode switching unit 24 acquires the detection result from the voltage detection circuit 34. In this step S11, as the detection result, the result of comparing IG with the lower limit threshold value (IGL) and the result of comparing IG with the upper limit threshold value (IGH) are acquired. Upon acquiring the detection result, the mode switching unit 24 determines in step S12 whether IG is equal to or higher than IGL.

When the mode switching unit 24 determines that IG is not equal to or higher than IGL, the result becomes NO in step S12. Thus, the mode switching unit 24 shifts to step S16 and switches the operation mode from the restricted operation mode to the stop mode. The case where the voltage drop occurs and IG becomes lower than IGL is equivalent to the case where it is assumed that the power supply to the controller unit 12 is likely to become unstable. In such a case, most of the functional units included in the controller unit 12 are restricted from operating. In this case, the mode switching unit 24 is in a functional state.

Subsequently, the mode switching unit 24 shifts to step S15 and determines whether or not the system is ended to stop the operation of the vehicular apparatus 1. When the mode switching unit 24 determines that the system is ended, the result becomes YES in step S15. Thus, the process is ended. On the other hand, when the mode switching unit 24 determines that the system is not ended, the result becomes NO in step S15. Thus, the process proceeds to step S11 and the acquisition and determination of the detection result are repeated.

When it is determined that IG is not equal to or higher than IGL again after being switched to the stop mode, the operation mode is not switched in step S16, and the current stop mode is maintained.

Now, suppose that after switching to the stop mode, the voltage drop is resolved and the voltage rises. In this case, the mode switching unit 24 compares, in step S12, the detection result acquired in step S11, and determines that IG is equal to or higher than IGL.

Therefore, the result becomes YES in step S12; thus, the mode switching unit 24 determines whether IG is equal to or higher than IGH in step S13. At this time, when the mode switching unit 24 determines that IG is not equal to or higher than IGH, the result becomes NO in step S13, so that the process proceeds to step S16 to maintain the stop mode.

On the other hand, when the mode switching unit 24 determines that IG is equal to or higher than IGH, the result becomes YES in step S13. Thus, the mode switching unit 24 switches the operation mode from the stop mode to the restricted operation mode in step S14. As a result, the control-related functional units and the control-related devices 27 can become operable. In this way, the mode switching unit 24 switches between the restricted operation mode and the stop mode based on IG.

Note that FIG. 7 describes switching between the restricted operation mode and the stop mode. In contrast, in the restricted operation mode, the process shown in FIG. 6 is executed. Therefore, even in the case where it is determined that IG is equal to or higher than IGH, if it is determined that +B is equal to or higher than +BH, the mode switching unit 24 switches the operation mode to the full operation mode. In this case, simply, the process shown in FIG. 6 is added after the step S13 in FIG. 7. Thereby, the final operation mode can be selected according to the detection results of IG and +B.

Figure 8:
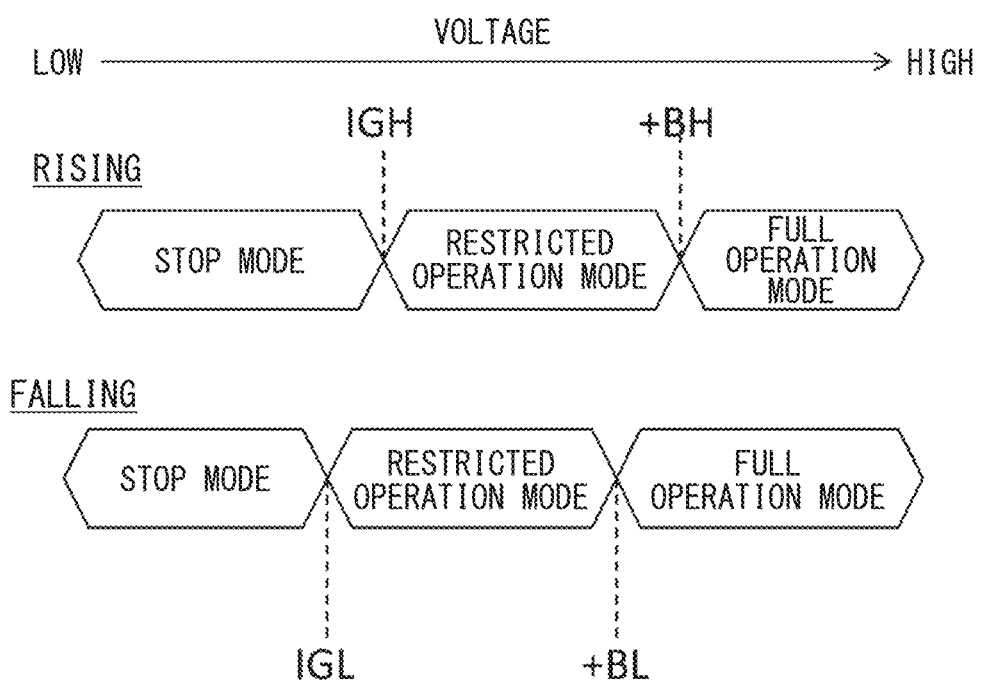
FIG. 8 is a diagram schematically showing an example in which the operation mode transitions.

By executing these processes, the vehicular apparatus 1 can provide transitions or switchover of the operation mode as shown in FIG. 8. That is, in the voltage rising case, the stop mode takes place in the range where IG is lower than IGH; the restricted operation mode takes place in the range where IG is equal to or higher than IGH and +B is lower than +BH; and the full operation mode takes place in the range where +B is equal to or higher than +BH.

In contrast, in the voltage falling case, the full operation mode takes place in the range where +B is equal to or higher than +BL; the restricted operation mode takes place in the range where +B is lower than +BL and IG is equal to or higher than IGL; and the stop mode takes place in the range where IG is lower than IGL.

As described above, the operation mode is switched according to the voltages in that way. It is thus possible to restrict the operation of the functional unit that uses the MM-related device 28 and the operation of the MM-related device 28, when the operation of the MM-related device 28 may become unstable. In other words, when there is a risk that the operation becomes unstable due to a voltage drop, the vehicular apparatus 1 switches to an operation mode in which a normally operable functional unit or device is put into an operable state.

According to the embodiment described above, the following effects can be obtained. A vehicular apparatus 1 includes a controller unit 12, a voltage detection circuit 24, and a mode switching unit 24. The controller unit 12 receives a power supply from a battery 25 mounted on a vehicle. The controller unit 12 includes a plurality of functional units, which include a vehicle information drawing unit 16 as a first functional unit configured to display information on a state of the vehicle. The voltage detection circuit 34 is configured to detect a voltage of the power supply from the battery 25. The mode switching unit 24 is configured to switch an operation mode to a full operation mode or a restricted operation mode based on the voltage of the power supply detected by the voltage detection circuit 34. The full operation mode enables all of the plurality of functional units in the controller unit 12 to be operable. The restricted operation mode enables a part of the plurality of functional units at least including the first functional unit configured to display information on the state of the vehicle to be operable.

With such a configuration, when a voltage drop occurs, only a part of the functional units are allowed to be operable while a remaining part of the functional units are restricted from operating. For example, it is possible to restrict the operation of some functional units that use a device whose minimum operating voltage is relatively high and whose operation may become unstable when the voltage drops. In addition, some functional units, which use a device that can operate stably even when the voltage drops, are enabled to maintain their operation.

This can reduce the risks of malfunctions in the vehicular apparatus 1, such as a malfunction that causes the functional unit using the device not to work properly, a malfunction that operates the functional unit to thereby input a signal higher than the lowered voltage of the power supply to the device and damage it. Further, the operation of the functional unit whose operation is required to be maintained can be maintained even when the voltage drops.

Further, the vehicular apparatus 1 includes a meter display 2 provided as a display on a meter panel 6. The mode switching unit 24 enables the vehicle information drawing unit 16 as the functional unit configured to display information on the meter display 2 to be operable. As described above, the meter display 2 displays vehicle information regarding the running and/or safety of the vehicle. Therefore, by making the vehicle information drawing unit 16 operable in the restricted operation mode, it is possible to provide the vehicle information to the user.

Further, for example, in cases where the vehicular apparatus 1 can be activated by being triggered due to the opening of the vehicle door, even if cranking occurs during activation, displaying operation on the meter display 2 can be continued. Therefore, the activation message can be displayed without interruption.

Further, in the restricted operation mode, the vehicular apparatus 1 restricts the second functional unit, which is configured to display the multimedia information, from operating. For example, the navigation drawing unit 17 that presents multimedia information is assumed to use the audio amplifier 22 for sound guidance. The audio amplifier 22 is a device whose operation may become unstable when a voltage drop occurs as described above.

Therefore, the operation of the functional unit that displays multimedia information is restricted. This makes it possible to reduce the risk of malfunctions such as unintended audio output and/or unintended display.

Further, in the vehicular apparatus 1, the mode switching unit 24 is further configured to switch the operation mode to the restricted operation mode in response to the voltage of the power supply from the battery 25 becoming lower than a predetermined falling threshold value (+BL), and to the full operation mode in response to the voltage of the power supply from the battery 23 becoming equal to or higher than a predetermined rising threshold value (+BH) that is set to be higher than the predetermined falling threshold value (+BL). That is, the mode switching unit 24 switches the operation mode with hysteresis.

As a result, even if a temporary voltage drop occurs and the voltage fluctuates in a short period of time, it is possible to reduce the possibility that the operation mode is repeatedly switched in a short period of time. Therefore, it is possible to suppress the possibility that the operation of the vehicular apparatus 1 appears to the user as being extremely unstable.

Further, the vehicular apparatus 1 includes the first power supply circuit 29 and the second power supply circuit 30. The first power supply circuit 29 has a first minimum operating voltage at which the power supply is enabled. The first minimum operating voltage is set lower than each of the predetermined falling threshold value and the predetermined rising threshold value. The first power supply circuit 29 is configured to provide the power supply to a device 12, 13, 20 included in the plurality of devices used by a functional unit in the plurality of functional units which is operable in the restricted operation mode. The second power supply circuit 30 has a second minimum operating voltage at which the power supply is enabled. The second minimum operating voltage is set higher than the first minimum operating voltage of the first power supply circuit. The second power supply circuit 30 is configured to provide the power supply to a different device 21, 22, 23 included in the plurality of devices used by a different functional unit included in the plurality of functional units which is restricted from operating in the restricted operation mode.

The voltage detection circuit 34 is further configured to detect the voltage of the power supply from the second power supply circuit 30. The mode switching unit 24 is configured to switch the operation mode to the restricted operation mode in response to the voltage of the power supply from the second power supply circuit 30 becoming lower than the falling threshold value, and to the full operation mode in response to the voltage of the power supply from the second power supply circuit 30 becoming equal to or higher than the rising threshold value.

That is, in the restricted operation mode, the mode switching unit 24 restricts the operation of the functional unit that uses the device to which the power is supplied from the second power supply circuit 30 in which the power supply becomes unstable when the voltage drops. As a result, as described above, when a voltage drop occurs, only a part of the functional units are allowed to be operable while a remaining part of the functional units are restricted from operating. For example, it is possible to restrict the operation of some functional units that use a device whose minimum operating voltage is relatively high and whose operation may become unstable when the voltage drops.

In this case, the first power supply circuit 29 is connected to the battery 25 via the switch 26b. Therefore, even when the fuse 26a is removed in order to reduce the dark current when the vehicle is transported, the display can be displayed on the meter panel 6 by turning on the switch 26b by the ignition operation.

Further, in the vehicular apparatus 1, the mode switching unit 24 is further configured to switch the operation mode to a stop mode in response to the voltage of the power supply inputted to the first power supply circuit 29 becoming lower than a predetermined lower limit threshold value (IGL), and to switch to the restricted operation mode in response to the voltage of the power supply inputted to the first power supply circuit 29 becoming equal to or higher than a higher limit threshold value (IGH) set to be higher than the lower limit threshold value (IGL). Note that, as described above, if +B is equal to or higher than the rising threshold value (+BH), the operation mode can be switched to the full operation mode.

That is, when the voltage drops greatly and falls below the lower limit threshold value (IGL), the mode switching unit 24 switches the operation mode to the stop mode in advance on the assumption that the power supply from the first power supply circuit 29 becomes unstable. On the other hand, when the voltage becomes equal to or higher than the lower limit threshold value (IGL), the mode switching unit 24 switches the operation mode from the stop mode to the restricted operation mode on the assumption that the power supply from the first power supply circuit 29 becomes stable.

As a result, it is possible to prevent the controller unit 12 from suddenly stopping due to a large voltage drop. In addition, hysteresis is also provided for switching between the stop mode and the restricted operation mode; thus, it is possible to reduce the possibility that the operation mode is repeatedly switched in a short period of time, and it is possible to suppress the possibility that the operation of the vehicular apparatus 1 appears to the user as being extremely unstable.

Further, the vehicular apparatus 1 controls the display operation on a plurality of displays such as the meter display 2 and the center display 3. In this case, for example, the meter display 2 may be supplied with power from a power supply circuit compatible with low voltage, and the center display 3 may be supplied with power from a power supply circuit not compatible with low voltage. As a result, for example, by setting the functional unit that displays information on the meter display 2 into a state in which it can operate in the restricted operation mode, it is possible to provide information on the running and/or safety of the vehicle.

Further, the restricted operation mode may be divided into a plurality of divisional restricted operation modes. The mode switching unit 24 is further configured to restrict another part of the plurality of functional units individually based on the plurality of divisional restricted operation modes. In FIG. 5, for instance, the H-L range in +B may be divided into a plurality of divisional ranges to provide a full operation mode, and several restricted operation modes. When a voltage (+B) drops and moves from the full operation mode into the first restricted mode, for example, the operation of the functional unit using the audio amplifier 22 with a relatively high minimum operating voltage may be first restricted. When the voltage (+B) drops further, the operation of the functional unit that uses the communication circuit 23 whose minimum operating voltage is relatively lower than that of the audio amplifier 22 may be restricted.

Even with such a configuration, when a voltage drop occurs, only a part of the functional units are allowed to be operable while a remaining part of the functional units are restricted from operating. It is thus possible to restrict the operation of some functional units that use devices that may become unstable when the voltage drops. In addition, some functional units, which use a device that can operate stably even when a voltage drop occurs, can maintain their operation.

When switching to the restricted operation mode, for example, a message such as "function is being restricted" is displayed on the meter display 2, or a speech is output from the speaker 4. This can provide a configuration to notify that the vehicular apparatus 1 is aware that a voltage drop has occurred. As a result, the vehicular apparatus 1 itself can be configured to notify that it is operating correctly. Alternatively, the menu screen image 11 displayed on the center display 3 may be blurred or grayed out. As a result, although it is different from the normal state, the vehicular apparatus 1 itself can be configured to notify that it is operating correctly.

In the embodiment, an example is shown in which power supply is started when a predetermined signal is input. However, for example, the start and stop of the power supply from the first power supply circuit 29 and the second power supply circuit 30 may be controlled based on the detection result of the voltage value by the voltage detection circuit 34.

Although the present disclosure has been described in accordance with the embodiment, it is understood that the present disclosure is not restricted to the embodiment or structures. The present disclosure also includes various modifications and modifications within an equivalent range. In addition, various combinations and forms, and further, other combinations and forms including only one element, or more or less than these elements are also within the sprit and the scope of the present disclosure.

In the above embodiment, each of the controller unit 12 and the power supply controller unit 32 may be provided separately as one or more than one controller; in contrast, the controller unit 12 and the power supply controller unit 32 may be provided integrally as one or more than one controller. Such a controller and method thereof described in the present disclosure may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits.

The computer programs may be stored, as instructions to be executed by a computer, in a tangible non-transitory computer-readable storage medium.

For reference to further explain features of the present disclosure, the description is added as follows.

There is known a vehicular apparatus that displays information in a display in a vehicle. The displayed information is related to the state of the vehicle such as speed, warnings, or regulations, or related to so-called multimedia display such as a navigation screen image and a menu screen image. There is also known a vehicular apparatus integrating a functional unit for displaying information on the state of a vehicle and a functional unit for displaying multimedia information. Hereinafter, a vehicular apparatus integrating a plurality of functional units will be referred to as an integrated vehicular apparatus for convenience.

Such a vehicular apparatus is powered by a battery mounted on the vehicle. It is known that when the engine is started, the current consumption increases to drive the starter motor, and the voltage in the battery drops temporarily lower than the rated voltage. The voltage drop may also occur due to environmental factors such as battery deterioration or cold weather.

The functional unit that displays multimedia information may employ a device having a relatively high minimum operating voltage, such as an audio amplifier for audio output. Therefore, if a voltage drop occurs, a device may stop. The functional unit uses such a device may not work properly. Further, by operating the functional unit, a signal higher than the lowered voltage of the power supply may be input to damage the device. There may be a risk that the vehicle equipment will malfunction.

It is thus desired for the present disclosure to provide a vehicular apparatus capable of reducing the possibility of a malfunction occurring when a voltage drop occurs.

An aspect of the present disclosure described herein is set forth in the following clauses.

According to an aspect of the present disclosure, a vehicular apparatus is provided to include a controller unit, a voltage detection circuit, and a mode switching unit. The controller unit includes a plurality of functional units, which include a first functional unit configured to display information on a state of the vehicle and a second functional unit configured to display multimedia information. The voltage detection circuit is configured to detect a voltage of a power supply from a battery mounted on a vehicle. The mode switching unit is configured to switch an operation mode to a full operation mode or a restricted operation mode based on the voltage of the power supply detected by the voltage detection circuit. The full operation mode enables all of the plurality of functional units in the controller unit to be operable. The restricted operation mode enables a part of the plurality of functional units at least including the first functional unit configured to display information on the state of the vehicle to be operable.

With such a configuration according an aspect of the present disclosure, when a voltage drop occurs, only a part of the functional units are allowed to be operable while a remaining part of the functional units are restricted from operating. For example, it is possible to restrict the operation of some functional units that use a device whose minimum operating voltage is relatively high and whose operation may become unstable when the voltage drops. In addition, some functional units, which use a device that can operate stably even when the voltage drops, are enabled to maintain their operation.

This can reduce the risks of malfunctions in the vehicular apparatus, such as a malfunction that causes the functional unit using the device not to work properly, a malfunction that operates the functional unit to thereby input a signal higher than the lowered voltage of the power supply to the device and damage it. Further, the configuration according the aspect of the present disclosure can maintain the operation of the functional unit whose operation is required to be maintained even when the voltage drops.

What is claimed is:

1. A vehicular apparatus comprising:
a single controller unit including a plurality of functional units implemented by software to use a plurality of devices provided with power supply from a battery mounted on a vehicle, the plurality of functional units including a first functional unit configured to display information on a state of the vehicle and a second functional unit configured to display multimedia information;
a voltage detection circuit configured to detect a voltage of the power supply from the battery; and
a mode switching unit configured to switch an operation mode to a full operation mode or a restricted operation mode based on the voltage of the power supply detected by the voltage detection circuit, wherein
the full operation mode enables all of the plurality of functional units controlled by software in the single controller unit to be operable, and
the restricted operation mode maintains a part of the plurality of functional units at least including the first functional unit configured to display information on the state of the vehicle to be operable among the plurality of functional units controlled by software, and restricts the operation of part of the plurality of functional units that use at least one of the plurality of devices,
the functional units are implemented by software by a program executed on the single controller unit,
the single controller unit has a real-time OS (Operating System) and a general-purpose OS, and
the real-time OS performs the function of displaying information about a status of the vehicle, while the general-purpose OS performs the function of displaying multimedia information,
the vehicular apparatus further comprising:
a vehicle information drawing unit configured to display vehicle information on a meter display and the mode switching unit are implemented by the real-time OS, and
a navigation drawing unit configured to display a navigation screen image on a center display, a menu drawing unit configured to display a menu screen image, and a communication unit configured to communicate with an external device are implemented by the general-purpose OS.

2. The vehicular apparatus according to claim 1, further comprising:
a display provided on a meter panel,
wherein:
the first functional unit, which is enabled by the mode switching unit to be operable in the restricted operation mode, is configured to display the information on the display.

3. The vehicular apparatus according to claim 1, wherein:
in the restricted operation mode, the second functional unit, which is configured to display the multimedia information, is restricted by the mode switching unit from operating.

4. The vehicular apparatus according to claim 1, wherein:
the mode switching unit is further configured to switch the operation mode
to the restricted operation mode in response to the voltage of the power supply from the battery becoming lower than a predetermined falling threshold value, and
to the full operation mode in response to the voltage of the power supply from the battery becoming equal to or higher than a predetermined rising threshold value that is set to be higher than the predetermined falling threshold value.

5. The vehicular apparatus according to claim 4, further comprising:
a first power supply circuit having a first minimum operating voltage at which the power supply is enabled to be set lower than each of the predetermined falling threshold value and the predetermined rising threshold value, the first power supply circuit being configured to provide the power supply to a device included in the plurality of devices used by a functional unit in the plurality of functional units which is operable in the restricted operation mode; and
a second power supply circuit having a second minimum operating voltage at which the power supply is enabled to be set higher than the first minimum operating voltage of the first power supply circuit, the second power supply circuit being configured to provide the power supply to a different device included in the plurality of devices used by a different functional unit included in the plurality of functional units which is restricted from operating in the restricted operation mode,
wherein:
the voltage detection circuit is further configured to detect the voltage of the power supply from the second power supply circuit; and
the mode switching unit is configured to switch the operation mode to the restricted operation mode in response to the voltage of the power supply from the second power supply circuit becoming lower than the falling threshold value, and to the full operation mode in response to the voltage of the power supply from the second power supply circuit becoming equal to or higher than the rising threshold value.

6. The vehicular apparatus according to claim 5, wherein:
the mode switching unit is further configured to switch the operation mode
to a stop mode in response to the voltage of the power supply inputted to the first power supply circuit becoming lower than a predetermined lower limit threshold value, and
to the restricted operation mode in response to the voltage of the power supply inputted to the first power supply circuit becoming equal to or higher than a higher limit threshold value set to be higher than the lower limit threshold value.

7. The vehicular apparatus according to claim 1, further comprising:
a plurality of displays that are individually controlled by the single controller unit.

8. The vehicular apparatus according to claim 1, wherein:
the restricted operation mode is divided into a plurality of divisional restricted modes; and
the mode switching unit is further configured to restrict another part of the plurality of functional units individually based on the plurality of divisional restricted modes.

9. A vehicular apparatus to a vehicle, comprising:
a voltage detection circuit configured to detect a voltage of a power supply from a battery mounted on the vehicle;
at least one processor coupled to the voltage detection circuit; and
at least one memory coupled to the processor, the memory storing computer-readable instructions configured to, when executed by the processor, cause the processor to:
implement a plurality of functional units to use a plurality of in-vehicle devices receiving the power supply from the battery, the plurality of functional units including a first functional unit configured to display information on a state of the vehicle and a second functional unit configured to display multimedia information, and
switch an operation mode to a full operation mode or a restricted operation mode based on the voltage of the power supply detected by the voltage detection circuit, wherein
the full operation mode enables all of a plurality of functional units controlled by software in a single controller unit to be operable, and
the restricted operation mode maintains a part of the plurality of functional units at least including the first functional unit configured to display information on the state of the vehicle to be operable among the plurality of functional units controlled by software, and restricts the operation of part of the plurality of functional units that use at least one of the plurality of in-vehicle devices,
the single controller unit has a real-time OS (Operating System) and a general-purpose OS, and
the real-time OS performs the function of displaying information about a status of the vehicle, while the general-purpose OS performs the function of displaying multimedia information,
the vehicular apparatus further comprising:
a vehicle information drawing unit configured to display vehicle information on a meter display and a mode switching unit are implemented by the real-time OS, and
a navigation drawing unit configured to display a navigation screen image on a center display, a menu drawing unit configured to display a menu screen image, and a communication unit configured to communicate with an external device are implemented by the general-purpose OS.

10. The vehicular apparatus according to claim 9, wherein:
the instructions are configured to, when executed by the processor, further cause the processor to:
prevent the second functional unit configured to display the multimedia information from operating in the restricted operation mode.

* * * * *